(12) United States Patent
Maidl et al.

(10) Patent No.: US 12,452,235 B2
(45) Date of Patent: *Oct. 21, 2025

(54) ACCESS TO DATA STORED IN A CLOUD (71) Applicant: ServiceNow, Inc., Santa Clara, CA (US)

(72) Inventors: Monika Maidl, Munich (DE); Stefan Seltzsam, Ismaning (DE)

(73) Assignee: ServiceNow, Inc., Santa Clara, CA (US)

( * ) Notice: Subject to any disclaimer, the term of this patent is extended or adjusted under 35 U.S.C. 154(b) by 775 days.

This patent is subject to a terminal disclaimer.

(21) Appl. No.: 17/706,079

(22) Filed: Mar. 28, 2022

(65) Prior Publication Data
US 2022/0286448 A1 Sep. 8, 2022

Related U.S. Application Data

(63) Continuation of application No. 16/883,479, filed on May 26, 2020, now Pat. No. 11,290,446, which is a
(Continued)

(30) Foreign Application Priority Data

Jun. 8, 2011 (DE) .......................... 102011077218.9

(51) Int. Cl.
*H04L 9/40* (2022.01)
*G06F 16/25* (2019.01)
*G06F 21/10* (2013.01)

(52) U.S. Cl.
CPC ........ *H04L 63/0853* (2013.01); *G06F 16/252* (2019.01); *G06F 21/10* (2013.01)

(58) Field of Classification Search
CPC ... H04L 63/0853; G06F 16/252; G06F 21/10; G06F 21/6218
See application file for complete search history.

(56) References Cited

U.S. PATENT DOCUMENTS

| 5,941,947 | A | 8/1999 | Brown et al. |
| 6,321,229 | B1 | 11/2001 | Goldman |
| | | (Continued) | |

FOREIGN PATENT DOCUMENTS

| DE | 102009040615 A1 | 3/2011 |
| DE | 102009054114 A1 | 5/2011 |
| | (Continued) | |

OTHER PUBLICATIONS

Li et al., "Fine-grained Data Access Control Systems with User Accountability in Cloud Computing", Nov. 2010, IEEE Second International Conference on Cloud Computing Technology and Science, pp. 89-96 (Year: 2010).*

(Continued)

*Primary Examiner* — Kenneth W Chang
(74) *Attorney, Agent, or Firm* — FLETCHER YODER PC (57) ABSTRACT

Digital rights management is extended such that control over the access to data stored in a cloud remains with the originator of the data. The access information is coordinated between a rights application in the cloud and a rights server outside the cloud. A rights policy is used for fine-grained regulation of the access for users (user groups), computers (client, server) and validity periods. The access limits actions that can be performed with the data, such as a server application being provided with access to index said data without being able to access the complete contents of the data in the process. The access extension may be used for any type of distributed data processing in which the data are intended to be protected against unauthorized access operations.

20 Claims, 1 Drawing Sheet

Related U.S. Application Data continuation of application No. 16/397,740, filed on Apr. 29, 2019, now Pat. No. 10,666,647, which is a continuation of application No. 14/124,728, filed as application No. PCT/EP2012/058514 on May 9, 2012, now Pat. No. 10,320,777.

(56) References Cited

U.S. PATENT DOCUMENTS

| | | |
|---|---|---|
| 6,609,122 B1 | 8/2003 | Ensor |
| 6,678,835 B1 | 1/2004 | Shah et al. |
| 6,816,898 B1 | 11/2004 | Scarpelli |
| 6,918,113 B2 | 7/2005 | Patel |
| 7,020,706 B2 | 3/2006 | Cates |
| 7,028,301 B2 | 4/2006 | Ding |
| 7,062,683 B2 | 6/2006 | Warpenburg |
| 7,069,330 B1 | 6/2006 | Mcardle |
| 7,131,037 B1 | 10/2006 | LeFaive |
| 7,170,864 B2 | 1/2007 | Matharu |
| 7,350,209 B2 | 3/2008 | Shum |
| 7,356,840 B1 | 4/2008 | Bedell et al. |
| 7,437,362 B1 | 10/2008 | Ben-Natan |
| 7,610,512 B2 | 10/2009 | Gerber |
| 7,617,073 B2 | 11/2009 | Trinon |
| 7,665,127 B1 | 2/2010 | Rao et al. |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,495,611 B2 | 7/2013 | McCarthy et al. |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 2002/0078361 A1 | 6/2002 | Grioux |
| 2002/0138726 A1 | 9/2002 | Sames |
| 2003/0229783 A1 | 12/2003 | Hardt |
| 2005/0228984 A1 | 10/2005 | Edery |
| 2006/0041751 A1 | 2/2006 | Rogers |
| 2006/0129627 A1 | 6/2006 | Phillips |
| 2007/0162749 A1 | 7/2007 | Lim |
| 2007/0227246 A1 | 10/2007 | Vian et al. |
| 2007/0266156 A1 | 11/2007 | Wilkins |
| 2007/0277231 A1 | 11/2007 | Medvinksy |
| 2007/0300306 A1 | 12/2007 | Hussain |
| 2008/0082601 A1 | 4/2008 | Meijer |
| 2008/0320603 A1 | 12/2008 | Ito |
| 2009/0100529 A1* | 4/2009 | Livnat ............. G06F 21/62 726/28 |
| 2009/0210915 A1 | 8/2009 | Millman et al. |
| 2009/0328134 A1 | 12/2009 | Ray et al. |
| 2010/0082713 A1 | 4/2010 | Frid-Nielsen |
| 2010/0211781 A1* | 8/2010 | Auradkar ............. H04L 63/123 713/168 |
| 2010/0235903 A1 | 9/2010 | Carter et al. |
| 2010/0248698 A1 | 9/2010 | In et al. |
| 2010/0274816 A1* | 10/2010 | Guzik ............. H04N 21/4223 348/207.99 |
| 2010/0318812 A1 | 12/2010 | Auradkar |
| 2010/0332401 A1 | 12/2010 | Prahlad |
| 2011/0022642 A1* | 1/2011 | deMilo ............. G06F 16/122 707/805 |
| 2011/0126168 A1* | 5/2011 | Ilyayev ............. G06F 9/5072 717/103 |
| 2011/0137947 A1 | 6/2011 | Dawson et al. |
| 2011/0265168 A1 | 10/2011 | Lucovsky et al. |
| 2011/0289134 A1 | 11/2011 | de los Reyes et al. |
| 2011/0307947 A1* | 12/2011 | Kariv ............. H04L 63/08 726/9 |
| 2012/0042216 A1 | 2/2012 | Blubaugh |
| 2012/0167197 A1 | 6/2012 | Kruger et al. |
| 2012/0233712 A1 | 9/2012 | Falk et al. |

FOREIGN PATENT DOCUMENTS

| | | |
|---|---|---|
| WO | 9859481 A1 | 12/1998 |
| WO | 0115377 A1 | 3/2001 |

OTHER PUBLICATIONS

Wikipedia—Lightweight Directory Access Protocol. Editing status: Jan. 6, 2011. URL: https://en.wikipedia.org/w/index.php?

Access-control list. In: Wikipedia, the free encyclopedia. Editing status: Apr. 4, 2011. URL: https://en.wikipedia.org/w/index.php?title=Access-control_list&oldid=422298771 [retrieved on Jul. 7, 2023].

Summons from German patent application No. 10 2011 077 218.9 dated Jul. 14, 2023; 8 pgs.

Agarwal et al., Access Control for Semantic Web Services, Jul. 2004, IEEE International Conference of Web Services Proceedings, pp. 770-773.

Goyal et al., Policy-Based Even-Driven Services-Oriented Architecture for cloud Services Operation & Management, Sep. 2009, IEEE International Conference on Cloud Computing, pp. 135-138 (Year 2009).

* cited by examiner

ACCESS TO DATA STORED IN A CLOUD

RELATED CASES

The present patent document is a continuation of U.S. application Ser. No. 16/883,479, filed May 26, 2020, which is a continuation of U.S. application Ser. No. 16/397,740, filed Apr. 29, 2019, which is a continuation of U.S. application Ser. No. 14/124,728, filed Mar. 13, 2014 (submitted Dec. 8, 2013), which is a § 371 nationalization of PCT Application Serial Number PCT/EP2012/058514, filed May 9, 2012, designating the United States, which claims the benefit of priority DE 102011077218.9, filed Jun. 8, 2011, which are hereby incorporated by reference.

FIELD

The present embodiments relate to a method for accessing data stored in a cloud and to corresponding apparatuses.

BACKGROUND

The term "cloud computing" describes an approach for dynamically providing abstracted information technology (IT) infrastructures (for example computing capacity, data memory, network capacities or else finished software) in a manner adapted to the requirements via a network. From the point of view of the user, the infrastructure provided appears to be remote and opaque, like wrapped in a "cloud."

With this approach, part of the IT landscape (in this context, hardware such as the computing center, data memory and software, for instance) is no longer operated on the user side or provided at the user's location but rather is rented as a service from one or more providers, for example, these providers being able to be geographically remote. The applications or data are no longer situated (only) on the local computer or a (company) computing center but rather in the "cloud." In this case, the cloud may be part of the Internet or may comprise the latter.

Cloud computing makes it possible to provide network-based applications in new business models. Services in the cloud may be provided on different levels in this case:

(a) Infrastructure (IaaS):

A potential customer "rents" computing power in order to implement his own services. For this purpose, cloud computing uses computing centers that are either concentrated at one location or can be interconnected in a distributed manner in order to provide flexible services. Virtual machines are implemented on these computers. The customers load data (for example images) into the cloud and processing is effected in the computing center without user interaction.

(b) Platform (PaaS):

The customer gains access to a platform that includes, on the one hand, the infrastructure for providing a service as well as particular software parts (for example middleware) that can be used to create services. The service created thereby is a web application, for example.

(c) Software (SaaS):

A cloud provider provides a network-based application that is used by the customer using his browser. In this case, documents or data records can be created or processed by the customer using the browser.

The outsourcing of applications and data may be a security threat since data and documents are stored with the cloud provider and—depending on the type of cloud or implementation of the service—are also processed there (that is to say data also accessed in the cloud).

For example, local system administrators of the service operator (also referred to as cloud system administrators) therefore have any desired access to the data if no special protective measures are taken. In addition, other attacks on the data are possible and the user who outsources his data to the cloud does not know what security measures have been taken for his data and whether the measures are effective. In other words, the user cannot estimate or can only poorly estimate the actual threat to his possibly confidential or sensitive data.

Continuous protection of the data from unauthorized access and, in particular, shielding from the system administrators (this is also referred to as "operator shielding") are important prerequisites for outsourcing critical (for example security-relevant and/or confidential) data to the cloud. Continuous protection that is independent of the security measures provided by the cloud provider can be achieved only when the owner of the data has control over access to the data and the security measures required for this purpose.

A document-based cloud application includes of a program running on the server (also referred to as a server application or AppS) and a program that runs locally with the user (also referred to as a client application or AppC) and typically runs in a web browser. In this case, depending on the architecture, the division of software between the server application and the client application may be scaled or configured differently.

A widespread method for protecting data in cloud applications is the encryption of the data. There are two variants in this case:

(A) The encryption is carried out by the owner of the data before documents are transferred to the cloud application. The owner manages the corresponding keys. The documents are continuously protected when being transported to and from the cloud and during storage in the cloud.

(B) The cloud application encrypts documents upon arrival or when being stored on local data storage media inside the cloud, the cloud provider managing an encryption key. The secure transport of the documents should be explicitly ensured by using a secure channel (for example using a secure hypertext transfer protocol, "https").

In case (A), it is not possible to process the documents and data in the cloud but only to purely store them. Useful processing of documents is therefore possible, only after decryption by a user, locally on his computer. The secure management of the key material used that is made available to all authorized users who intend to view or process the documents is problematic and complicated in this case.

Since, in case (B), the encryption is carried out by the rented software inside the cloud, there are points of attack for circumventing the encryption for cloud system administrators, for example. In order to securely implement such a solution, known methods also require, in addition to technical method, organizational measures that are usually a weak point. The owner of the data therefore places a considerable amount of trust in the cloud provider as the operator of the cloud application to the effect that the cloud provider securely implements an encryption solution.

Known as digital rights management (DRM: Digital Rights Management) is a system for companies, referred to as EDRM (Enterprise Digital Rights Management), that provides access protection for documents irrespective of their storage location. A protected document can be opened and processed by an authorized user only in accordance with his access rights that are valid for this, irrespective of where the document has been stored or how it has been transmitted. An unauthorized user without access rights cannot start anything with a copy of the document that he has received by email, for example, or has discovered on a USB stick.

However, in order to use EDRM, the applications must be specifically adapted for EDRM, that is to say the applications are supplemented with an EDRM functionality, since the basis of EDRM is the encryption of documents. The publisher of a document encrypts the document before he releases the document; the publisher also additionally defines the rights for users and/or groups for the document. The encrypted file including the access rights is sent to an EDRM server.

In addition to the EDRM server that is the central part of the EDRM approach, there is an EDRM client that is installed on every computer intended to process EDRM-protected documents. The EDRM client communicates with the EDRM server in order to determine the key and the rights of a user with respect to a document. The EDRM server provides the key only after the user has been authenticated with respect to the EDRM server. The EDRM client transfers the rights to an application that has EDRM capability and is responsible for complying with the rights. The EDRM client decrypts the document and carries out renewed encryption that is possibly required later. The key is kept secret, even from a user with administration rights, by the EDRM client using code obfuscation and other technologies.

Figure 1:
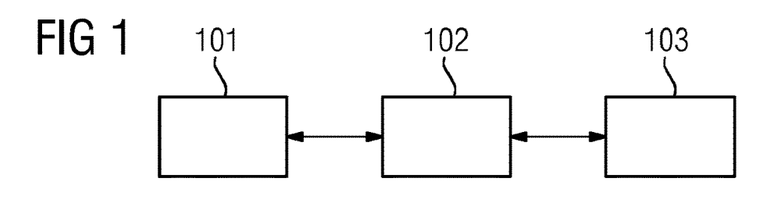
FIG. 1 depicts an architecture of a known EDRM approach.

FIG. 1 depicts an architecture of a known EDRM approach. An EDRM client 101 is connected to an EDRM server 102. The EDRM server is connected to a further EDRM client 103, for example a computer belonging to a customer, a supplier or a business partner. The EDRM clients 101, 103 and the EDRM server may be functionalities (comprising hardware and/or software) that are provided or installed on computers, for example personal computers.

A (protected) document is created as follows:
(1) The author/owner creates the document.
(2) The author/owner encrypts the document with the aid of the EDRM client 101 and specifies the access rights in a format specified by the EDRM system, a EDRM policy. In this case, it is possible to describe and allocate access rights in a detailed manner: for example, it is possible to define for each authorized person whether the latter can read, print, change or redistribute the document. A period of time during which access is allowed can also be limited (for example in a personal manner).
(3) The encrypted document is sent, together with the rights, to the EDRM server 102.

The protected document is accessed as follows:
(1) A user loads the protected document into an application (for example an application running locally on his computer). He locally needs the EDRM client 103 for access. This EDRM client 103 is connected to the local device and to the user using cryptographic protocol.
(2) The EDRM client 103 contacts the EDRM server 102 that responds with a request to authenticate the user.
(3) If the authentication is successful, the EDRM client 103 receives the rights object with the EDRM policy and the decryption key.
(4) The EDRM client 103 decrypts the document and forwards it to the application. Actions on the document such as printing or processing are carried out by the application only if the EDRM client 103 allows this according to the rights specified in the EDRM policy. This means that the application is adapted to the EDRM functionality.

It is possible to use existing EDRM solutions in connection with a cloud and to thus protect documents through encryption. EDRM can therefore be considered to be a functionality that includes an encryption method with key management. In a similar manner to variants (A) and (B) described above, the owner of the document can operate the EDRM server 102 (and can therefore have the key management under his control) or else the cloud provider can provide the EDRM server 102.

With respect to the cloud application, documents can be stored with EDRM protection, with the result that these documents can be locally processed only by authorized users (according to the EDRM policy) on their device. The following problems arise in this case:

(a) If documents are intended to be processed online by the server application (AppS) (for example for editing a document or for converting it into a PDF file), corresponding reading or processing rights must be granted to the server in known EDRM systems. All processing operations that are carried out by the server application are therefore carried out with the EDRM authorization of the server, that are automatically granted, in particular without any previous user authentication. This is a point of attack that can be used, for example, by system administrators or external attackers.

(b) Existing EDRM systems cannot distinguish between processing by the server (for example search indexing or checking for viruses) and processing by the (authorized) user. Even if the processing is carried out by an authorized user who edits a document, for example, it is not possible to understand in the EDRM system who has accessed the document since only access by the server is entered in the corresponding log entries on the EDRM server.

(c) The two parts of the application, that is to say the server application and the client application, run in different contexts, that is to say on the server and locally on the user's computer, with different security requirements. Depending on the risk assessment, an owner of a document will more likely allow processing by the client application or else by the server application, for example. Furthermore, depending on the division of the application, it may be desirable for the client application to be allocated different rights than the server application. For example, a right for printing a document is less useful for a server application than, for example, a right for converting the document into a PDF file. Without a distinction between the rights of the server application and the client application, the semantics of some rights are unclear, which may result in problems when specifying the rights for a document.

SUMMARY AND DESCRIPTION

The object of the invention is to avoid the abovementioned disadvantages and, in particular, to specify an efficient solution for securely using data stored in a cloud.

This object is achieved according to the features of the independent claims. Preferred embodiments can be gathered, in particular, from the dependent claims.

In order to achieve the object, a method for accessing (in particular for using) data stored in a cloud is proposed, (a) a request for access to the data 1s transmitted from a rights application to a rights server,
(b) the rights server checks, on the basis of the request from the rights application, whether access to the data is allowed,
(c) if access to the data is allowed, the rights server provides the rights application with an item of access information,
(d) the rights application accesses the data.

According to the explanations made in this document, the cloud can be a resource (for example a partially generally accessible or publicly accessible resource) in a network, for example the Internet.

The cloud comprises data and an application. The services of the cloud can be provided by a cloud provider.

Accordingly, no access to the data may be allowed or explicit refusal or rejection may be effected if the check revealed that access is not allowed.

The present solution enables finely graduated access control to data or applications provided by a cloud, in particular for document-based applications or database access operations. In this case, access can be advantageously effected under the supervision of an owner of the data or applications.

The rights application may be part of the server application. In particular, the server application and the rights application may be implemented inside the cloud, for example with a cloud provider or in an environment controlled by the latter.

It is additionally noted that two rights applications may be provided, one rights application that is assigned to the client application and one rights application that is assigned to the server application.

One development is that, before act (a), a client application is authenticated with a server application.

The server application may be an application of the cloud provider. In this case, access to the data can be coordinated using the server application. In particular, the server application may be a database application that accesses protected data (records) of a database in the cloud. In particular, the data are stored in the cloud in encrypted form and decryption is carried out using the rights application described here.

Another development is that the rights application accesses the data and forwards the latter to the server application.

For example, the database may have a database management system that coordinates access to the data records. The database management system may transmit encrypted data records (or parts of data records) to the rights application that carries out the decryption (if access is allowed). The decrypted data may be transmitted to the server application, for example, via the database management system or may be transmitted to the server application directly. It is also possible for the decrypted data to be transmitted to the client application via the server application.

In particular, a development is that the client application transfers an authentication token to the server application, which token is transmitted from the rights application to the rights server in order to gain access to the data.

A development is also that the client application transfers a reference that is transmitted from the rights application of the server to the rights server, the rights server requesting and/or carrying out authentication on the basis of the reference.

In particular, a development is that the reference is a reference to a rights application of the client.

Furthermore, one development is that the rights application is a rights application in a first environment and/or a rights application in a second environment.

The first environment is, for example, an environment of a company or a user, that is to say, in particular, a local environment that the client application can run and is at least largely under the control of a user or user group.

In contrast, the second environment is an environment of the cloud, for example an environment of a cloud provider. For example, the second environment may be a publicly accessible network, for example the Internet or part of the Internet. The second environment is not subject to the user's control.

For example, a distinction can be made between the rights of a user on the local computer on which the client application runs and the rights on the server on which the server application runs. The respective rights can accordingly be implemented differently by rights applications on the client and the server.

In this case, it is noted that the computer denotes any desired computer, for example a portable computer or a workstation computer or else a mobile terminal (for example a mobile telephone, smart phone, digital assistant), a tablet computer, etc. In principle, any device with which "cloud computing" is possible can be referred to as a computer.

Within the scope of an additional development, the rights server is provided in the first environment.

It is thus advantageous for the rights server to be in the trusted environment of the user, the user group or the company. It can thus be ensured that the security-relevant information is stored in the sphere of influence of the user or client application. It is not possible to access protected data without this information. This considerably reduces the required trust that is placed in the cloud provider.

The rights application of the cloud, that is to say of the cloud provider, communicates with the rights server via a protected connection, for example, in order to obtain the access information for accessing the security-relevant data stored in the cloud. A cloud system administrator is not able to view the data either without this access information from the rights server.

A next development involves the request from the rights application comprising at least one of the following items of information:
an item of user information,
an item of computer information, in particular an identification of a computer,
an item of information for identifying the data that are intended to be accessed.

One refinement is that the access information comprises:
a rights policy;
a key for decrypting the data.

The rights policy relates to an agreement, for example according to notation of a rights language, of who can do what with particular data and for how long. In this case, different actions can be defined for different users, user groups or computers. It is also possible, according to the rights policy, for an operation to be able to be carried out on the data without completely reading the data (for example indexing of data records by the server).

An alternative embodiment involves the rights server checking, on the basis of the request from the rights application, whether access to the data is allowed by carrying out a comparison with the rights policy previously created for the data.

For example, a user or a user group can create data and can provide the latter with particular rights for particular users or user groups. The resultant rights policy is stored on the rights server. This ensures that, during subsequent access, only those users or computers with permission to do so can access the data. Furthermore, the type of access to the data can also be defined or restricted using the rights policy.

A next refinement is that the rights policy comprises at least one of the following items of information:
- an item of user or computer information,
- an action that can be carried out by the user or computer,
- an action that cannot be carried out by the user or computer, a validity period.

One advantage is that the rights policy can be used to distinguish between rights of a user or a computer belonging to the user and rights of the server. Therefore, the user can process the data without having to grant rights to the server for this purpose.

Furthermore, it is also possible to use the rights policy to grant particular rights to the server, with the result that the latter can automatically carry out predefined tasks, for example indexing files. Rights can be reduced to minimum requirements by allowing access only to some of the data, for example. This advantageously minimizes the possibility for misuse by administrators of the cloud application or by other external attackers.

A refinement is also that communication between the rights server and the rights application is secure.

For example, communication or the connection between components or processes can be secured by suitable cryptographic methods or measures.

One development involves the rights server logging at least some of the requests.

An additional refinement is that the data comprise:
- at least one document;
- at least one application;
- at least one database entry, in particular a database.

In particular, the data may contain confidential or partially confidential or other sensitive information. In principle, there is great interest in storing data in the cloud because accessibility is possible from everywhere, for example via the Internet. The creation of backup copies or the porting of data if a new computer is set up is also dispensed with. In contrast, there is the disadvantage that data stored once in the public network, in principle, can be viewed, copied or used in another manner by unauthorized parties more easily than is the case with data stored locally on a computer. The present approach provides a solution here that involves using the advantages of cloud computing and simultaneously ensuring increased protection of personal or other confidential data.

The above object is also achieved by an apparatus for accessing data stored in a cloud, comprising a processing unit that is set up in such a manner that
(a) a request for access to the data can be transmitted from a rights application to a rights server,
(b) the rights server can check, on the basis of the request from the rights application, whether access to the data is allowed,
(c) if access to the data is allowed, the rights server can provide the rights application with an item of access information,
(d) the rights application can access the data.

The apparatus may be a component in the cloud, in particular a component belonging to the cloud provider, or a local component belonging to the user or to the company wishing to use the cloud provider's service. For example, the apparatus may be a server on which the server application and the rights application of the server run. The apparatus may also be a local computer belonging to the user, on which the client application and the rights application of the client run. An option is also for the apparatus to be a computer on which the rights server can (also) be operated. The apparatus may be arranged, for example, in the first or second environment explained above.

The processing unit may be, in particular, a processor unit and/or an at least partially hard-wired or logical circuit arrangement that is set up, for example, in such a manner that the method can be carried out as described herein. Said processing unit may be or comprise any type of processor or computer with accordingly required peripherals (memories, input/output interfaces, input/output devices, etc.).

The above explanations relating to the method accordingly apply to the apparatus. The apparatus may be configured in one component or distributed in a plurality of components. In particular, part of the apparatus may also be connected via a network interface (for example the Internet).

The solution presented herein also comprises a computer program product that can be loaded directly into a memory of a digital computer, comprising program code parts that are suitable for carrying out acts of the method described here.

The abovementioned problem is also solved by a computer-readable storage medium, for example any desired memory, comprising instructions (for example in the form of program code) that can be carried out by a computer and are suitable for the computer to carry out acts of the method described here.

The above-described properties, features and advantages of this invention and the manner that they are achieved become more clearly and distinctly comprehensible in connection with the following schematic description of exemplary embodiments that are explained in more detail in connection with the drawings. In this case, identical or identically acting elements can be provided with the same reference symbols for clarity.

DETAILED DESCRIPTION OF THE PREFERRED EMBODIMENTS

The present solution is based, in particular, on an EDRM system or is an extension of a known EDRM system. A secure way of handling data stored in a cloud is proposed, in which case they may be different types of data. The scenarios of a document management system and a database are described by way of example below, that is to say for the case where documents or database entries are intended to be stored in the cloud.

According to the definition mentioned in the introduction, the cloud is a resource in a network, for example the Internet, that is accessible to a multiplicity of users of different stations or computers (for example personal computers, laptops, mobile terminals, smart phones, personal digital assistants, etc.) via wireless or wired interfaces. In particular, the cloud comprises data (for example documents, databases), applications for accessing the data and data security components.

Figure 2:
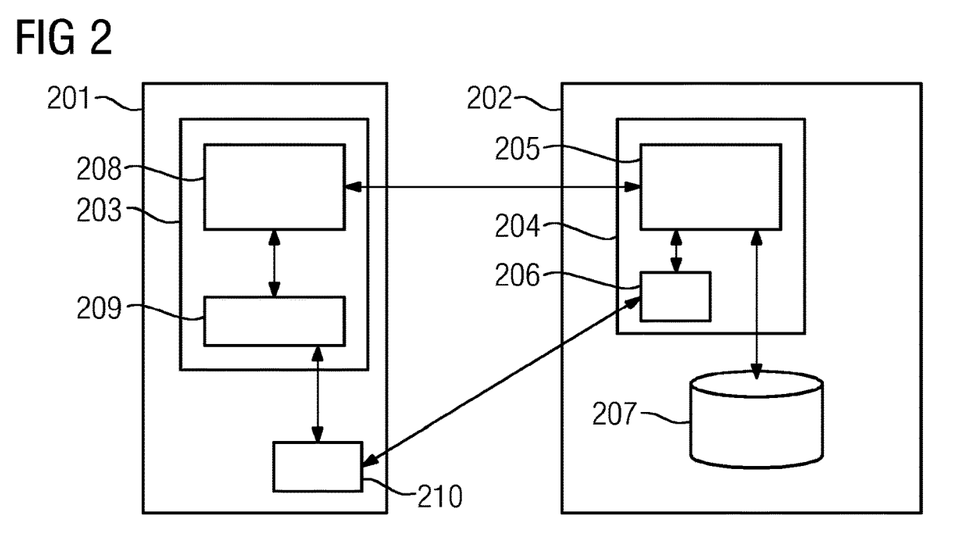
FIG. 2 depicts a schematic overview of components of an architecture for a document management system.

FIG. 2 depicts a schematic overview of components of an architecture for a document management system.

An environment 201 corresponds, for example, to a company environment, for example a computer network belonging to a company. A cloud 202 denotes an environment of an external network, for example part of the Internet or a network that is connected to the environment 201 via the Internet. For example, the cloud 202 is provided by an external service provider and makes it possible to flexibly access the data or programs stored in the cloud. The data may also be part of programs that run locally on a computer connected to the cloud 202.

The cloud 202 contains an environment 204 that corresponds to an application environment provided by a service provider (also referred to as a cloud provider). The environment 204 comprises a server application 205 and a rights application 206. A data memory 207 (for example in the form of a central or decentralized database) is also provided in the cloud.

An environment 203 that corresponds to an individual environment of a user 1s provided inside the environment 201.

This may be, for example, a computer that belongs to the user and is incorporated inside the environment 201. A client application 208 and a rights application 209 are provided in the environment 203. A rights server 210 is also situated inside the environment 201.

The user can use the client application 208 to access the server application 205 of the cloud 202.

The mechanisms of this approach are explained in more detail below:

For example, a rights policy (for example in the form of an EDRM policy language) is used and can be used to distinguish between the rights of a user for processing documents in the client application (AppC) and in the server application (AppS), for example. The rights policy is, for example, an agreement on particular rights for particular applications and/or users for a predefined period of time, for example.

The rights policy may have the following format, for example:
Document:
→User 1: rights (AppS), rights (AppC); validity range
→User 2: rights (AppS), rights (AppC); validity range
→Server: rights; validity range Therefore, individual rights can be respectively allocated and (possibly additionally) a duration for the validity of the rights may be agreed for the document for user 1 and user 2 and the server.

For example, a user on the local device with the client application 208 could be granted only a right to view but not to change or print. However, this user could be allowed to process the document by the server application 205. In this case, processing may also comprise comprehensive functions; for example, the user could cause the document to be translated by the server application 205.

One example of a right that could be granted to the server application 205 is the indexing of documents. In this case, the server could be granted read access only to a respective particular section of a document containing keywords, with the entire document, including the part with the keywords (that itself can be sensitive information), being protected.

The rights are allocated depends, for example, on the functionality of the application and its architecture, in particular also on a division of functions between the client application 208 and the server application 205.

If a document is processed by a user using the client application 208 (that is to say the document is loaded into the memory of the local device and is therefore loaded into the environment 203), it may be useful to allow only processing by this client application 208. If, in contrast, the document is processed by the server application 205 and the client application 208 only receives and forwards individual commands, for example, processing rights of the user are useful only for the server application 205. In this case, the right to be able to download documents may be an option for the client application 208.

The rights application 206 runs inside the environment 204, for example together with the server application 205, on a computer. The rights application 206 implements the rights according to the specifications in the rights policy in the environment 204. These may be specifications of the user or the server itself. The rights application 206 is protected from attacks; in particular, mechanisms that allow keys to be stored by the rights application 206 with a high degree of security are provided. For example, the environment 204 comprising the server application 205 and the rights application 206 can be classified as trusted and measures that justify such a trusted classification can be taken or agreed for this environment 204.

The rights application 209 is situated inside the environment 203, for example on a device belonging to the user, and implements the user rights specified for the client side there. The rights application 209 is protected from attacks (like the rights application 206) and has mechanisms that can securely store keys.

The server application 205 communicates with the client application 208, the server application 205 communicating with the rights application 206 and the client application 208 communicating with the rights application 209 in order to encrypt a document, determine the rights policy, request the decryption of the document and implement the specified rights. For this purpose, the server application 205 and the client application 208 should be designed to be trusted. This can be achieved by virtue of the server application 205 and the client application 208 and their actions respectively being signed, that is to say a signature that is checked by the rights application 206 and by the rights application 209 is created.

The rights server 210 is set up to manage the rights policy (or files that form the rights policy) and the encryption keys of protected documents. The rights server 210 also communicates with the rights application 209 and the rights application 206. In particular, the rights server 210 is designed for two clients, that is to say the two rights applications 209 and 206 in the example.

The approach proposed here is based on an EDRM system or extends an EDRM system and ensures effective protection from unauthorized access to documents. For this purpose, a user is authenticated with a web application, in which case a sufficiently high degree of security of passwords can be achieved by a particular complexity of the passwords and a limited allowed period of use. Furthermore, there may be a requirement for the user to have to input a password again after an application (session) has expired. Other or additional authentication mechanisms may also be provided, for example using biometric methods. Furthermore, access to particular documents may be enabled with varying degrees of authentication; for example, access to particular documents could be allowed only with additional authentication using a smartcard.

The information required for authentication is known to the rights server 210 and can advantageously be uniquely assigned to the correct user. This can be achieved, for example, by coupling identity management of the cloud application to identity management of the company that owns the documents.

It should also be ensured that communication between the rights server 210 and the two rights applications 209 and 206 is secure; this can be achieved using suitable known cryptographic functionalities.

Creation of a new document is described by way of example below:

(1) A user is authenticated with the client application 208 and states his identity and authentication information in the process. The client application 208 is authenticated with the server application 205 using the identity and authentication information.

(2) The user creates a document using the client application 208 and the server application 205.

(3) The user, as the owner or author of the document, specifies a rights policy for the document, for example with the aid of a graphical user interface of the client application 208 (or alternatively with the aid of or at least the involvement of the server application 205).

(4) The user specifies that the document is intended to be protected according to the rights policy defined by him. Depending on the architecture of the application, the document is encrypted using the rights application 209 or the rights application 206.

(5) The rights policy is transmitted, together with the encryption key, to the rights server 210. A log entry containing, for example, at least the following entries is generated: author (username), reference to the document, reference to the rights policy, date and time.

An existing document can be accessed, for example, as described below:

(1) A user is authenticated with the client application 208 and states his identity and authentication information in the process. The client application 208 is authenticated with the server application 205 using the identity and authentication information.

(2) The user wishes to access a particular document (for example open the document) using the client application 208 or the server application 205. For this purpose, the application 208 and/or 205 loads the document from the data memory 207.

(3) Depending on the architecture of the application, the document can be handled by the rights application 206 or by the rights application 209:

Variant 1: handling by the rights application 206 (on the server side):

(a) The rights application 206 contacts the rights server 210 by stating the user and the document.

(b) If the stated user has the required authorization for the document according to the rights policy, the rights application 206 receives a rights object containing the rights policy and the decryption key for the document from the rights server 210. The rights server 210 generates a log entry containing at least the following details: access (user, document, rights policy, date and time).

(c) The rights application 206 decrypts the document and forwards it to the server application 205. In the event of an action by the user, the server application 205 first of all asks the rights application 206 whether this action is allowed according to the rights policy.

Variant 2: handling by the rights application 209 (on the client side):

(a) The rights application 209 contacts the rights server 210 by stating the user and the document and a reference to the client application 208 used.

(b) If the user has the required rights for the document according to the rights policy, the rights application 209 receives a rights object containing the rights policy and the decryption key for the document from the rights server 210. The rights server 210 generates a log entry containing at least the following details: access (user, document, rights policy, date and time).

(c) The rights application 209 decrypts the document and forwards it to the client application 208. In the event of an action by the user, the client application 208 first of all asks the rights application 209 whether this action is allowed according to the rights policy.

The present solution allows finely graduated access control to data or applications provided by a cloud, in particular for document-based applications. In this case, it is possible for access to be effected under the supervision of an owner of the data or applications.

One advantage is that the rights policy for a document can be used to distinguish between rights of a user and rights of the server. Online processing by the user is therefore possible without having to grant rights to the server. Online processing by the user presupposes authentication of the user and is also logged with reference to the user (for example on the rights server).

Furthermore, it is possible to use the rights policy to also grant particular rights to the server, with the result that the latter can automatically carry out predefined tasks, for example indexing of files. These rights can be reduced to minimum requirements by not allowing access to the entire document but rather limiting access only to a section of the document, for example. This minimizes the possibility for misuse by administrators of the cloud application or by other external attackers.

It is also possible to distinguish between the rights of a user on the local computer that the client application runs and on the server that the server application runs. These rights are accordingly implemented by rights applications on the client and the server.

It is therefore advantageous that the owner of the data can control the use of his data also on external computer systems. Documents that are processed by cloud applications can thus be controlled. Such control is achieved, in particular, by the following properties:

The document is accessed (decrypted) by the server application only when an authenticated user who is authorized according to the rights policy accesses the document or when a server carries out tasks that have been explicitly allocated to said server by the rights policy and have been allowed. Every access operation can be accordingly logged on the rights server; in particular, the identity of the user or the server is stored in a log entry.

The rights applications of the server and of the client protect the decryption key received and ward off attacks by system administrators or other users.

During transport and data management, the document is suitably protected by encryption and the decryption key is known only to that application that is under the control of the owner of the document.

The correct authentication of users is an important prerequisite for secure access control. Control of authentication lies with the respective application. In particular, authentication can be carried out using the rights server. If the owner operates the rights server, control of authentication is under his control, just like the access rights.

Variant 1:

For authentication with the server application 205, the user uses a cryptographic authentication token that has been issued by the user's company or by a service provider, for example. If the user wishes to access a protected document, the server application 205 transfers this authentication token to the rights server 210 that checks the authentication token.

Using the authentication token has the advantage that the server application 205 in the cloud 202 need not be trusted to the effect that authentication is correctly implemented. Rather, the issuer of the authentication token (the company or the service provider here) is trusted. The decision regarding who should be trusted lies with the operator of the rights server.

Variant 2:

Authentication is requested by the rights server 210:
(1) A user is authenticated with the server application 205 using the client application 208 and, in addition to his identity and authentication information, states a reference to his rights application 209 in the process.
(2) If the user wishes to access a protected document via the server application 205, the following acts are carried out:
  (a) The server application 205 contacts the rights server 210 by stating the user, the document and the reference to the user's rights application 209.
  (b) The rights server 210 contacts the rights application 209 with the request to authenticate the user. The rights server 210 checks the authentication, for example by coupling to identity management of the company.
(3) If the user wishes to access a protected document using the client application 208, the following acts are carried out:
  (a) The user's local rights application 209 contacts the rights server 210.
  (b) The rights server 210 responds with the request for authentication to the user. This authentication is checked by the rights server 210.

Database-Based Application

It is also possible to provide and/or operate database-based applications in the cloud. A high degree of security and control over the data is also intended to be achieved for such applications.

An EDRM rights language for databases is used for this purpose and can be used to specify access rights to data in a database in the form of a rights policy. For this purpose, the EDRM rights language can provide corresponding language constructs that can be used to describe which data (for example objects, tuples, attributes) a user or a computer (belonging to the user or a server) has access to. Such a language construct can also be referred to as an RL expression.

Examples: a user can access a credit card number attribute of all tuples or the user can access only the credit card number attribute of the tuples assigned to him.

The rights policy can contain the users with their respective access authorization and can specify, for each user, which database entries said user can access. In this case, different rights can be agreed for different actions, for example for viewing a database entry or for changing the database entry. Instead of the user, a computer belonging to the user can also be identified and authenticated.

A server can also gain access rights that are required, for example, for automatically running processes, for example for a keyword search in patient files without accessing the name or address of the respective patient.

The rights policy can therefore be written down as follows, for example:

Database:
  →User 1:
    RL expression 1—action(s)—validity range
    RL expression 2—action(s)—validity range
    . . .
  User2:
    RL expression 3—action(s)—validity range
    RL expression 4—action(s)—validity range
    . . .
  →Server:
    RL expression N—action(s)—validity range
    RL expression N+1—action(s)—validity range
    . . .

In this case, the term "action(s)" stands for a set of rights that are assigned to a user or a computer belonging to the user or to a server. For example, rights for
  viewing,
  editing,
  deleting,
  adding,
  etc.
data (records) can be agreed (on the basis of the user, computer and/or time). Further database-specific actions can also be assigned rights, for example the right to track foreign key relationships.

Figure 3:
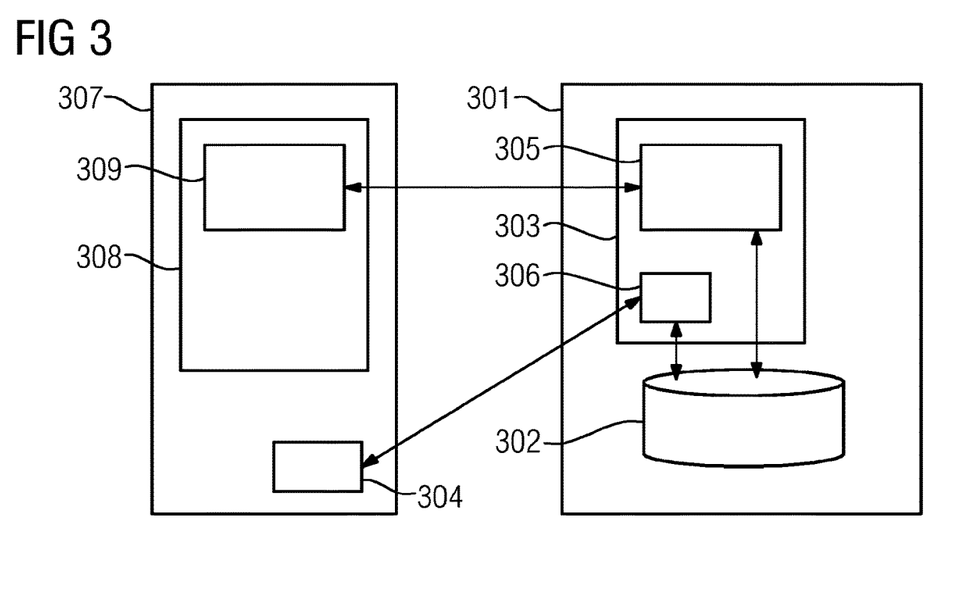
FIG. 3 depicts a schematic overview of components of an architecture for accessing a database stored in a cloud.

FIG. 3 depicts a schematic overview of components of an architecture for accessing a database 302 stored in a cloud 301.

An environment 307 corresponds, for example, to a company environment, for example a computer network belonging to a company. The cloud 301 denotes an environment of an external network, for example part of the Internet or a network that is connected to the environment 307 via the Internet. For example, the cloud 301 is provided by an external service provider and makes it possible to flexibly access the data or programs stored in the cloud, in particular the database 302.

The cloud 301 contains an environment 303 that corresponds to an application environment provided by a service provider. The environment 303 comprises a database application 305 and a rights application 306.

An environment 308 that corresponds to an individual environment of a user is provided inside the environment 307. This may be, for example, a computer that belongs to the user and is incorporated inside the environment 307. A client application 309 is provided in the environment 308. A rights server 304 is also situated inside the environment 307.

The user can use the client application 309 to access the database application 305 of the cloud 301.

The rights application 306 implements the rights specified in the rights policy for accessing the database 302 for users and servers. The rights application 306 and the database application 305 may run on a common computer and, in particular, may be accommodated in the same (secure) environment. The rights application 306 is suitably protected from attacks and is set up such that keys can be stored securely.

The database 302 includes a functionality of encrypting data records or parts of data records (for example attributes or tuples) and provides the rights application 306 with an interface that can be used to request decryption of data from the database. Furthermore, the database 302 implements rights according to the rights policy, that is to say does not allow data to be edited, for example, if the corresponding user does not have a right to do so. For this purpose, the database management system is designed to be trusted. For example, the database management system and actions of the latter may be respectively provided with a signature and the signature can be accordingly checked by the rights application 306.

The rights server 304 manages the (files of the) rights policy and the encryption keys of protected data and communicates with the rights application 306.

It is expressly pointed out again that the user may be an actual user or a user group with access rights. The user may also be a computer (belonging to a user) that may have a corresponding identification. Like a computer or a user, the server may also have or be provided with particular pre-definable access rights.

The generation of protected data may be described as follows:

(1) The user is authenticated with the database application 305 using the client application 309, for example a web application running in a web browser.

(2) The user specifies, for example via a graphical user interface of the client application 309, a rights policy that describes the access rights of different users or of the server to different data (attributes, objects and/or tuples) in the database 302. The rights policy relates, for example, to at least one database 302 in the cloud 301, with the result that the rights policy may comprise a reference to this database 302. The rights policy is stored on the rights server 304.

(3) The user uses the client application 309 and the database application 305 to add data to the database 302 and specifies that said data should be protected according to the rights policy. The rights application 306 encrypts the data with reference to the rights policy.

(4) The rights policy is sent, together with the encryption key, to the rights server 304. A log entry containing at least the following entries is generated: generation of the data, author (username), reference to the data, reference to the rights policy, date and time.

The access to and use of protected data can be described as follows:

(1) A user is authenticated with the database application 305 using the client application 309.

(2) The user calls a function of the database application 305 using the client application 309.

The database application 305 generates a corresponding database call (for example an SQL query) comprising the identity of the querying user in order to accordingly check the rights.

(3) If the database query is aimed at protected entries or comprises such entries, the database 302 generates (using its database management system) a request to the rights application 306 for decryption.

(4) The rights application 306 checks, by asking the rights server 304, whether the user has the corresponding access authorization according to the rights policy and, if this is the case, returns the unencrypted data.

(5) If a function call results in changes to database calls, the database 302 likewise generates (using its database management system) a request to the rights application 306 in order to determine whether the corresponding user has editing rights for the entry.

Every (attempted) access to a (protected) database entry can be logged on the rights server 304.

As explained above, it should be ensured that the authentication of the user is sufficiently secure and is possibly provided with different security levels for data with different relevance to security. For example, renewed authentication may be required after a database session has expired or after a predefined period of time has elapsed.

In particular, it must be ensured that the rights server 304 can securely communicate with the rights application 306. Communication between the server application 305 and the database 302 should likewise be secure. Communication between the client application 309 and the server application 305 should likewise be effected in a secure manner. Suitable known cryptographic methods can be used for secure communication.

The access protection proposed here for database-based applications makes it possible for companies to enforce continuous access control for data from their area of responsibility even if the data themselves are stored in databases in the cloud and are used or managed by applications in the cloud. Access control can be specified in an accurate and detailed manner, for example on the basis of or taking into account:

attributes, tuples and/or objects in the database,
access-authorized persons or groups,
granted rights, and/or
a validity period.

One option is to separately allocate rights for the database application 305 and the client application 309. This makes it possible to deliberately influence whether protected data, for example, can already be decrypted by the server application 305 of the database 302 by order of the user or whether this decryption can take place only in the environment 308, for example by the client application 309 that, for this purpose, communicates with an additional rights application in the environment 308 (see, in this respect, FIG. 2 with associated explanation). In this case, this additional rights application provides a functionality corresponding to the functionality of the rights application 306 in the environment 308 (for example the user's local computer).

For example, a credit card number of the user can be decrypted only locally on his computer; although the decryption of the credit card number would be protected by the rights application 308 in the environment 303, hackers could attempt to gain access to the data already in the environment 303 during decryption. However, depending on the attack scenario, it could be considered to be more secure to carry out the decryption only locally with the user in the environment 308.

It is therefore proposed, in particular, to extend known digital rights management (EDRM: Enterprise Digital Rights Management) such that control over access to data stored in a cloud remains with the user or creator of the data. For this purpose, coordination of the access information between a rights application in the cloud and a rights server in the area of the user (that is to say outside the cloud) is advantageous. A rights policy makes it possible to control access for users (user groups), computers (client, server) and validity periods in a fine-grained manner. In this case, access comprises a wide variety of actions that can be carried out with the data. In particular, it is advantageous that a server application gains (temporally limited) access to some of the data in order to index the latter, for example, without the server being able to access the complete contents of the data in this case. The approach works, for example, for document management and for databases outsourced to the cloud. The invention can be used for any type of distributed data processing in which the data are intended to be protected from unauthorized access.

Although the invention has been described and illustrated in more detail using the at least one exemplary embodiment shown, the invention is not restricted thereto and other variations can be derived therefrom by a person skilled in the art without departing from the scope of protection of the invention.

The invention claimed is:

1. A system comprising:
a server disposed in a local environment, the server comprising:
a processor; and
a memory storing an access policy and instructions that, when executed by the processor, cause the processor to perform operations comprising:
receiving, from a rights application, a request associated with a requesting application hosted in a cloud environment to access data stored in the cloud environment;
identifying a first set of access rights based on the access policy and the requesting application, wherein the first set of access rights define access to the data by the requesting application; and
transmitting, to the rights application, the first set of access rights, wherein the rights application is configured to allow the requesting application to access the data in accordance with the first set of access rights.

2. The system of claim 1, wherein the rights application is hosted in the local environment.

3. The system of claim 1, the operations comprising, receiving, from a second rights application, a second request associated with a second requesting application to access the data stored in the cloud environment, the access policy comprising a second set of access rights that define access to the data by the second requesting application.

4. The system of claim 3, wherein the second rights application is hosted in the cloud environment.

5. The system of claim 1, wherein:
the local environment is under control of a user; and
the cloud environment is a publicly accessible network and is not subject to control of the user.

6. The system of claim 1, the operations comprising:
receiving, from the rights application, a second request associated with a second requesting application to access the data stored in the cloud environment;
identifying a second set of access rights based on the access policy and the second requesting application, wherein the second set of access rights define access to the data by the second requesting application; and
transmitting, to the rights application, the second set of access rights, wherein the rights application is configured to allow the second requesting application to access the data in accordance with the second set of access rights.

7. The system of claim 6, wherein the second requesting application is hosted in the local environment.

8. The system of claim 1, wherein the data comprises an object, an attribute, or a tuple, or a combination thereof.

9. The system of claim 1, wherein the first set of access rights comprises a search indexing right, a document conversion right, or a document editing right, or a combination thereof.

10. The system of claim 1, wherein the rights application is hosted in the cloud environment.

11. A method comprising:
transmitting, from a rights application to a server disposed in a local environment, a request associated with a requesting application hosted in a cloud environment to access data stored in the cloud environment, the server storing an access policy comprising a first set of access rights that define access to the data by the requesting application;
receiving, from the server, the first set of access rights; and
allowing the requesting application to access the data in accordance with the first set of access rights.

12. The method of claim 11, comprising transmitting to the server, prior to transmitting the request, the access policy and a decryption key, wherein the decryption key is configured to decrypt an encrypted portion of the data.

13. The method of claim 12, comprising:
receiving, from the server, the decryption key; and
decrypting the encrypted portion of the data.

14. The method of claim 11, wherein the rights application is hosted in the local environment.

15. The method of claim 11, comprising:
transmitting, to the server disposed in the local environment, a second request associated with a second requesting application hosted in the local environment to access the data stored in the cloud environment, the access policy comprising a second set of access rights that define access to the data by the second requesting application.

16. A non-transitory, computer readable medium comprising instructions that, when executed by a processor, causes the processor to perform operations comprising:
transmitting, from a rights application to a server disposed in a local environment, a request associated with a requesting application hosted in a cloud environment to access data stored in the cloud environment, the server storing an access policy comprising a first set of access rights that define access to the data by the requesting application;
receiving, from the server, the first set of access rights; and
allowing the requesting application to access the data in accordance with the first set of access rights.

17. The non-transitory, computer readable medium of claim 16, wherein the access policy comprises a second set of access rights that define access to the data by a second requesting application hosted in the local environment.

18. The non-transitory, computer readable medium of claim 17, wherein the second set of access rights differs from the first set of access rights.

19. The non-transitory, computer readable medium of claim 16, wherein the rights application is hosted in the local environment.

20. The non-transitory, computer readable medium of claim 16, wherein the rights application is hosted in the cloud environment.

* * * * *